United States Patent
Park et al.

(10) Patent No.: US 10,344,193 B2
(45) Date of Patent: Jul. 9, 2019

(54) ADHESIVE COMPOSITION FOR VACUUM THERMOFORMING AND DECORATION SHEET FOR VACUUM THERMOFORMING USING THE SAME

(71) Applicant: LG Hausys, Ltd., Seoul (KR)

(72) Inventors: Ji-Yong Park, Gimhae-si (KR); Byung-Hyun Roh, Ulsan (KR); Han-Na Lee, Ansan-si (KR)

(73) Assignee: LG HAUSYS, LTD., Seoul (KR)

( * ) Notice: Subject to any disclaimer, the term of this patent is extended or adjusted under 35 U.S.C. 154(b) by 53 days.

(21) Appl. No.: 15/555,908

(22) PCT Filed: Feb. 19, 2016

(86) PCT No.: PCT/KR2016/001673
§ 371 (c)(1),
(2) Date: Sep. 5, 2017

(87) PCT Pub. No.: WO2016/140452
PCT Pub. Date: Sep. 9, 2016

(65) Prior Publication Data
US 2018/0051195 A1    Feb. 22, 2018

(30) Foreign Application Priority Data

Mar. 5, 2015 (KR) .................. 10-2015-0030955

(51) Int. Cl.
| | |
|---|---|
| *C09J 175/04* | (2006.01) |
| *C09J 133/06* | (2006.01) |
| *B32B 7/12* | (2006.01) |
| *B32B 27/08* | (2006.01) |
| *C09J 9/00* | (2006.01) |
| *C08G 81/02* | (2006.01) |
| *C08G 18/62* | (2006.01) |
| *C08G 18/66* | (2006.01) |
| *C09J 7/35* | (2018.01) |
| *C09J 7/22* | (2018.01) |
| *C08G 18/75* | (2006.01) |
| *C08G 18/42* | (2006.01) |
| *C09J 175/06* | (2006.01) |
| *C08F 220/18* | (2006.01) |
| *C08G 18/68* | (2006.01) |
| *C08G 18/76* | (2006.01) |

(Continued)

(52) U.S. Cl.
CPC .............. *C09J 175/04* (2013.01); *B32B 7/12* (2013.01); *B32B 27/08* (2013.01); *C08F 220/18* (2013.01); *C08G 18/4216* (2013.01); *C08G 18/6229* (2013.01); *C08G 18/6633* (2013.01); *C08G 18/683* (2013.01); *C08G 18/75* (2013.01); *C08G 18/7642* (2013.01); *C08G 18/792* (2013.01); *C08G 18/807* (2013.01); *C08G 81/02* (2013.01); *C09J 7/22* (2018.01); *C09J 7/35* (2018.01); *C09J 9/00* (2013.01); *C09J 133/06* (2013.01); *C09J 133/066* (2013.01); *C09J 175/06* (2013.01); *C08F 2220/1858* (2013.01); *C09J 2201/622* (2013.01); *C09J 2423/006* (2013.01); *C09J 2427/006* (2013.01); *C09J 2433/00* (2013.01); *C09J 2433/006* (2013.01); *C09J 2455/006* (2013.01); *C09J 2469/006* (2013.01); *C09J 2475/00* (2013.01)

(58) Field of Classification Search
CPC . C09J 175/04; C09J 175/06; C09J 7/22; C09J 7/35; C09J 133/06; C09J 9/00; C09J 2423/006; C09J 2469/006; C09J 2427/006; C09J 2475/00; C09J 2201/622; C09J 2433/006; C09J 2455/006; C08F 2220/1858; C08F 220/18; C08G 18/683; C08G 18/7642; C08G 18/792; C08G 18/807; C08G 18/066; C08G 18/4216; C08G 18/75; C08G 18/6229; C08G 18/6633; B32B 27/08; B32B 7/12
See application file for complete search history.

(56) References Cited

U.S. PATENT DOCUMENTS

| | | | |
|---|---|---|---|
| 6,602,927 B1 | 8/2003 | Rothacker | |
| 7,332,539 B2 * | 2/2008 | Nakayama | ............. C08G 18/10 524/251 |
| 2005/0282990 A1 | 12/2005 | Schoenfeld et al. | |

(Continued)

FOREIGN PATENT DOCUMENTS

| | | |
|---|---|---|
| EP | 1283229 A1 | 2/2003 |
| JP | 2004-2827 A | 1/2004 |

(Continued)

OTHER PUBLICATIONS

Extended European Search Report dated Dec. 18, 2017, corresponding to European Application No. 16759038.4.

(Continued)

*Primary Examiner* — Christopher M Rodd
(74) *Attorney, Agent, or Firm* — Hauptman Ham, LLP

(57) ABSTRACT

The present invention provides a vacuum thermoforming adhesive composition containing a polyurethane polymer and an acrylic polymer and having a difference in melting temperature and cross-linking temperature of 30-60° C. In addition, provided is a vacuum thermoforming decoration sheet comprising: an adhesive layer, a substrate layer formed on the adhesive layer; a printing layer formed on the substrate layer, and a transparent substrate layer formed on the printing layer, wherein the adhesive layer is formed from the defroster vacuum thermoforming adhesive composition.

18 Claims, 2 Drawing Sheets

(51) Int. Cl.
  *C08G 18/79*  (2006.01)
  *C08G 18/80*  (2006.01)

(56) References Cited

U.S. PATENT DOCUMENTS

| | | |
|---|---|---|
| 2006/0019088 A1 | 1/2006 | Wang et al. |
| 2006/0099384 A1 | 5/2006 | Shane |
| 2007/0116903 A1 | 5/2007 | Song et al. |
| 2015/0037555 A1 | 2/2015 | Mai et al. |

FOREIGN PATENT DOCUMENTS

| | | |
|---|---|---|
| JP | 3776354 B2 | 5/2006 |
| JP | 2007-154168 A | 6/2007 |
| JP | 2008-502774 A | 1/2008 |
| JP | 2012-148426 A | 8/2012 |
| JP | 2013-543807 A | 12/2013 |
| JP | 2014-031003 A | 2/2014 |
| JP | WO2015012134 A1 | 1/2015 |
| KR | 10-1999-0083649 B1 | 5/2001 |
| KR | 10-2009-0103827 A | 10/2009 |
| KR | 10-2011-0075229 A | 7/2011 |
| KR | 10-2014-0009417 A | 1/2014 |
| WO | 01-880011 A1 | 11/2001 |
| WO | 2016-000222 A1 | 1/2016 |
| WO | 2016-117900 A1 | 7/2016 |

OTHER PUBLICATIONS

International Search Report dated Aug. 2, 2016 corresponding to International Application No. PCT/KR2016/001673.

* cited by examiner

ADHESIVE COMPOSITION FOR VACUUM THERMOFORMING AND DECORATION SHEET FOR VACUUM THERMOFORMING USING THE SAME

CROSS REFERENCE TO RELATED APPLICATION

This present application is a national stage filing under 35 U.S.C § 371 of PCT application number PCT/KR2016/001673 filed on Feb. 19, 2016 which is based upon and claims the benefit of priority to Korean Patent Application No. 10-2015-0030955 filed on Mar. 5, 2015 in the Korean Intellectual Property Office. The disclosures of the above-listed applications are hereby incorporated by reference herein in their entirety.

TECHNICAL FIELD

The present invention relates to an adhesive composition for vacuum thermoforming and a decoration sheet for vacuum thermoforming to which the composition is applied.

BACKGROUND ART

Conventionally, the interior materials for design of automobile parts did not occupy a larger proportion than the other parts, but as consumers' desires gradually become different and the design and function of automobile are differentiated, research and development of film materials for automobile interior materials are going on.

In recent years, as the needs for imparting simple decorations and tactile properties as well as improving the decorations and designs of automobile interior film materials have been increased, the decorating method has been applied with expansion to the three-dimensional surface and the vacuum thermoforming method is employed for applying decoration sheets to the injection molding. In this case, it is necessary to study the adhesive layer which can be attached to the interior material with flexibility in molding by controlling the reactivity of the functional group in compliance with the high temperature and high pressure condition so that the decoration sheet fuses well in the interior material.

DISCLOSURE

Technical Problem

The present invention provides an adhesive composition for vacuum thermoforming comprising a polyurethane polymer and an acrylic polymer and having a difference of 30° C. to 60° C. between melting temperature and cross-linking temperature.

The present invention also provides a decoration sheet for vacuum thermoforming comprising: an adhesive layer; a substrate layer formed on the adhesive layer; a printing layer formed on the substrate layer; and a transparent substrate layer formed on the printing layer, wherein the adhesive layer is formed from the adhesive composition for vacuum thermoforming.

However, the objects of the present invention are not limited to the objects mentioned above, another objects that are not mentioned will be understood clearly to those skilled in the art from the following description.

Technical Solution

The present invention provides an adhesive composition for vacuum thermoforming comprising a polyurethane polymer and an acrylic polymer and having a difference of 30 to 60° C. between the melting temperature and the cross-linking temperature.

Further, the present invention provides an adhesive composition for vacuum thermoforming wherein the melting temperature is 50° C. to 90° C. and the cross-linking temperature is 110° C. to 150° C.

Further, the present invention provides an adhesive composition for vacuum thermoforming wherein the acrylic polymer comprises 1 to 10 parts by weight based on 100 parts by weight of the solid content in the adhesive composition.

Further, the present invention provides an adhesive composition for vacuum thermoforming wherein the acrylic polymer has a weight average molecular weight of 200,000 to 800,000.

Further, the present invention provides an adhesive composition for vacuum thermoforming wherein the polyurethane polymer comprises 90 to 99 parts by weight based on 100 parts by weight of the solid content in the adhesive composition.

Further, the present invention provides an adhesive composition for vacuum thermoforming wherein the polyurethane polymer has a weight average molecular weight of 1,000 to 30,000.

Further, the present invention provides an adhesive composition for vacuum thermoforming wherein the polyurethane polymer is produced from an isocyanate compound and a polyol compound.

Further, the present invention provides an adhesive composition for vacuum thermoforming wherein the polyol compound contains one or more selected from the group consisting of a polyester-based polyol, a lactone-based polyol, a polycarbonate-based polyol, a polyether-based polyol and a combination thereof.

Further, the present invention provides an adhesive composition for vacuum thermoforming further comprising at least one additive selected from the group consisting of an adhesion-providing resin, a low molecular weight polymer, an epoxy resin, a curing agent, an UV stabilizer, an antioxidant, a colorant, a reinforcing agent, an anti-foaming agent, a surfactant, a plasticizer, a foaming agent, an organic salt and a combination thereof.

Further, the present invention provides an adhesive composition for vacuum thermoforming wherein the adhesive composition has a viscosity of 800 to 7,000 cps.

Further, the present invention provides a decoration sheet for vacuum thermoforming comprising an adhesive layer, a substrate layer formed on the adhesive layer; a printing layer formed on the substrate layer; and a transparent substrate layer formed on the printing layer, wherein the adhesive layer is formed from the above mentioned adhesive composition for vacuum thermoforming.

Further, the present invention provides a decoration sheet for vacuum thermoforming wherein a thickness of the adhesive layer is 10 to 50 μm.

Further, the present invention provides a decoration sheet for vacuum thermoforming wherein the substrate layer comprises at least one selected from the group consisting of a polymethyl methacrylate (PMMA), an acrylonitrile-butadiene-styrene (ABS), a thermoplastic polyolefin (TPO), a polyvinyl chloride (PVC), a polycarbonate (PC) and a combination thereof.

Further, the present invention provides a decoration sheet for vacuum thermoforming further comprising a release film layer on the lower surface of the adhesive layer.

Further, the present invention provides a decoration sheet for vacuum thermoforming wherein the release film layer comprises a polyethylene terephthalate (PET) film.

Further, the present invention provides a decoration sheet for vacuum thermoforming wherein the printing layer is formed by at least one method selected from the group consisting of a gravure printing, a flexographic printing, a rotary screen printing and a combination thereof.

Further, the present invention provides a decoration sheet for vacuum thermoforming further comprising an embossed layer on the transparent substrate layer.

Further, the present invention provides a decoration sheet for vacuum thermoforming wherein the embossed layer is formed by an embossing process.

Advantageous Effects

The adhesive composition for vacuum thermoforming according to the present invention comprises a polyurethane polymer and an acrylic polymer having a specific weight average molecular weight in a certain ratio and have the difference 30° C. to 60° C. between the melting temperature and the cross-linking temperature so that the composition has little deterioration at room temperature and high temperature durability.

Accordingly, the decoration sheet having the adhesive layer formed gy the adhesive composition for vacuum thermoforming can realize an adhesive layer having excellent adhesive ability and high temperature durability when the decorating sheet is attached to the injection molding through the vacuum thermoforming method, thereby improving the durability and surface texture of the manufactured product.

In addition, by applying the decoration sheet having the adhesive layer to the automobile interior material, it is possible to give an excellent aesthetic sense to the interior of the automobile.

BEST MODE FOR CARRYING OUT THE INVENTION

Figure 1:
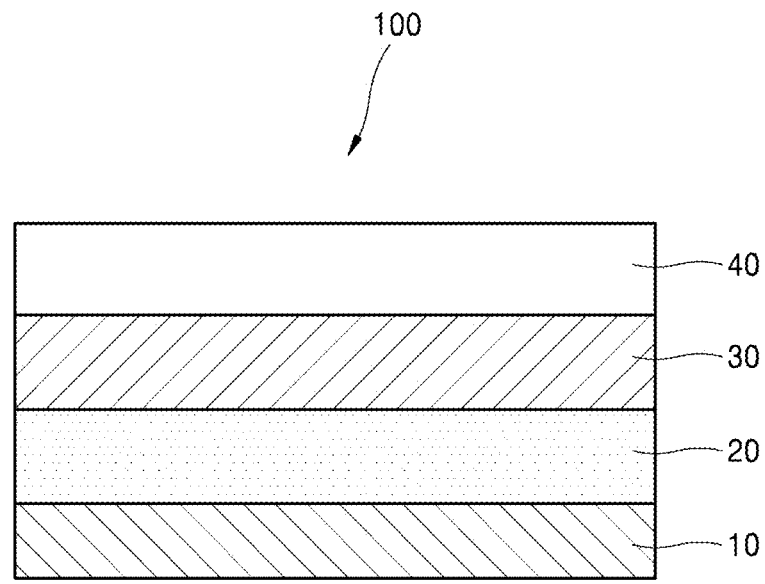
FIG. 1 schematically shows the cross section of the decoration sheet for vacuum thermoforming according to one embodiment of the present invention.

While studying the method of decorating automotive interiors in the vacuum thermoforming process, the inventors have found that the difference between the melting temperature and the crosslinking temperature of the adhesive forming the adhesive layer of the decoration sheet to be used in the vacuum thermoforming process is about 30° C. to about 60° C. by providing a first temperature range of about 50° C. to about 90° C. where the components of the adhesive melt and mix each other but the functional groups do not react with each other and a second temperature range of 110° C. to about 150° C. where the components are chemically cross-linked to proceed with adhesion, and thus the adhesive is excellent in high temperature durability. Accordingly, the present invention has been completed by this finding.

Hereinafter, embodiments of the present invention will be described in detail with reference to the accompanying drawings so that those skilled in the art can easily carry out the present invention. The present invention may be embodied in many different forms and is not limited to the embodiments described herein.

In order to clearly explain the present invention, those not related to the description are omitted, and the same or similar components are denoted by the same reference numerals throughout the specification.

In the drawings, the thicknesses are enlarged to clearly indicate layers and regions, and the thicknesses of some layers and regions are exaggerated for the convenience of explanation.

Hereinafter, formation of an arbitrary structure in the "upper (or lower)" or "on (or under)" of the substrate means that any structure is formed in contact with the upper surface (or lower surface). However, the present invention is not limited to not including other structures between the substrate and any structure formed on (or under) the substrate.

Adhesive Composition for Vacuum Thermoforming

Vacuum thermoforming method is one of the methods of decorating decoration sheet on injection moldings of various interior and exterior materials such as automobile and furniture. Since the vacuum thermoforming method is performed at a high temperature and a vacuum, it is important to realize an adhesive layer having excellent adhesion and high temperature durability so that the decoration sheet can be well adhered to injection moldings.

In the vacuum thermoforming method, the heater is ignited after the suction of the vacuum in order to stretch the decoration sheet before the table placed with the injection molding having no pattern on the surface thereof is lifted for attaching the decoration sheet to the injection molding. At this time, the heater heats the decoration sheet to a temperature of 100° C. to 150° C. and the adhesive agent forming the adhesive layer of the decoration sheet is melted so that the decorating sheet can be easily attached to the injection molding when it is lifted up. Thereafter, the heater is extinguished, the table placed with the injection molding is lifted up and pressed on the decoration sheet, and then the adhesive layer is cross-linked to finish the surface decorating treatment of the injection molding.

In this regard, the present invention provides an adhesive composition for vacuum thermoforming having a melting temperature and a cross-linking temperature suitable for the adhesive layer in the production of the decoration sheet in the vacuum thermoforming process.

Accordingly, at a first temperature range of about 50° C. to about 90° C., the adhesive components of the adhesive composition for vacuum thermoforming of the present invention are melted and mixed, but their functional groups do not react each other and only the solvent is volatilized to form an adhesive layer, and at a second temperature range of about 110° C. to about 150° C., the adhesive components are chemically cross-linked to proceed with adhesion.

The present invention provides an adhesive composition for vacuum thermoforming comprising a polyurethane polymer and an acrylic polymer, and having the difference of about 30° C. to about 60° C. between the melting temperature and the cross-linking temperature.

Specifically, the melting temperature may be about 50° C. to about 90° C., and the crosslinking temperature may be about 110° C. to about 150° C. In the vacuum thermoforming process using conventional adhesives, the higher the adhesion temperature is, the better the high temperature durability is satisfied. However, the film may be damaged due to high heat, and the processability may be lowered. In addition, when the adhesion temperature is designed to be lower than 110° C. in consideration of film damage and processability in the vacuum thermoforming, the adhesion between the injection molding and the decorating sheet is deteriorated at the high temperature durability test.

In order to overcome such a problem, when the surface of the injection molding is decorated with the decoration sheet in the vacuum thermoforming process by applying the adhesive composition for vacuum thermoforming of the present invention, for example, the adhesive is melted at about 90° C. and then cross-linked at about 150° C. to provide the adhesive layer suitable for the present process.

The acrylic polymer comprises 1 to 10 parts by weight based on 100 parts by weight of the solid content in the adhesive composition.

The acrylic polymer may be produced by polymerizing acrylate monomers or oligomers. There may be used the various acrylate monomers in the present invention as listed below, but not limited to these: bi-functional acrylates of 1,2-ethylene glycol diacrylate, 1,12-dodecanediol acrylate, 1,4-butanediol di(meth)acrylate, 1,6-hexanediol di(meth) acrylate, neopentylglycol di(meth)acrylate, polyethylene glycol di(meth)acrylate, neopentylglycol adipate di(meth) acrylate, hydroxylpivalic acid neopentylglycol di(meth) acrylate, dicyclopentanyl di(meth) acrylate, caprolactone-modified dicyclopentenyl di(meth)acrylate, ethyleneoxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate or 9,9-bis[4-(2-acryliloyloxyehoxyphenyl] fluorine, etc., ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, etc.;

3-functional acrylates of trimethylolpropane tri(meth) acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(meth)acryloxyethyl isocyanuated, etc.;

4-functional acrylates of diglycerine tetra(meth)acrylate or pentaerythritol tetra(meth)acrylate, etc.;

5-functional acrylates of propionic acid-modified dipentaerythritol penta(meth)acrylate, etc.; and 6-functional acrylates of dipentaerythritol hexa(meth) acrylate, carprolactone-modified dipentaerythritol hexa(meth)acrylate, etc.

The acrylic polymer is contained in the adhesive in an amount of about 1 to about 10 parts by weight based on 100 parts by weight of the solid content of the adhesive composition, thereby imparting the pre-adhesion effect to the adhesive and controlling the difference between the melting temperature and the crosslinking temperature to about 40° C. When the content of the acrylic polymer is 1 part by weight or less, there is a problem that initial adhesion is not exhibited on the substrate. When the content of the acrylic polymer exceeds 10 parts by weight, there is a fear that the adhesive force of the adhesive is lowered at a high temperature since the content of the polyurethane polymer capable of exhibiting the adhesive force at a high temperature is reduced.

Also, the acrylic polymer may have a weight average molecular weight of 200,000 to 800,000. By maintaining the weight average molecular weight of the acrylic polymer within the above range, it is possible to control the melting and crosslinking temperature range of the adhesive, and to provide an adhesive which is excellent in high temperature durability and adhesive force.

Next, the adhesive composition for vacuum thermoforming comprises a polyurethane polymer, wherein the polyurethane polymer may be comprised in an amount of about 90 to about 99 parts by weight based on 100 parts by weight of the solid content of the adhesive composition.

The polyurethane polymer is produced by a polymerization reaction wherein an alcohol having an active hydroxyl group is polymerized with an isocyanate having an isocyanate group, generating a reaction heat. Since the polyurethane polymer is comprised in the adhesive, it is possible to impart flexibility to the adhesive to be stretched when formed. Specifically, since the polyurethane polymer is comprised in the adhesive in an amount of about 90 to about 99 parts by weight based on 100 parts by weight of the solid content of the adhesive composition, it is possible to impart flexibility and adhesion to the adhesive. If the content of the polyurethane polymer is less than or exceeds the above range, flexibility and high adhesive strength at high temperature may not be achieved.

Also, the polyurethane polymer may have a weight average molecular weight of 1,000 to 30,000, preferably about 3,000 to about 10,000. The adhesive composition for vacuum thermoforming according to the present invention can have the effect of flexibility and high adhesive strength, when it comprises the polyurethane polymer within the said range.

The polyurethane polymer may be prepared from an isocyanate compound and a polyol compound.

The isocyanate compound has at least two isocyanate groups per molecule, and the aromatic diisocyanates and their derivatives may be used.

Examples of the isocyanate compound are listed as below, but not limited to these: toluene diisocyanate, diphenylmethane diisocyanate, modified diphenylmethane diisocyanate, naphthalene diisocyanate, phenylene diisocyanate, hexamethylene diisocyanate, lysine diisocyanate, cyclohexane diisocyanate, isophorone diisocyanate, methylenediphenyl isocyanate, xylene diisocyanate, tetramethyl xylene diisocyanate, norbornene diisocyanate, triphenylmethane triisocyanate, polyphenyl polymethylene polyisocyanate, polyisocyanate containing carbodiimide group, polyisocyanate containing allophanate group, polyisocyanate containing isocyanurate group. They may be used alone in the present invention, or at least one selected from the group of their combinations may be used.

Also, polyol compound may be at least one selected from the group consisting of polyester-based polyols, lactone-based polyols, polycarbonate-based polyols, polyether-based polyols and combinations thereof, preferably polyester-based polyols or polyether-based polyols. Polyester-based polyols are excellent in properties such as hydrolysis resistance, low-temperature flexibility, resistance to acid and alkali, electrical insulation and the like, and polyether-based polyols can impart properties such as flexibility and high elongation.

Specifically, weight ratio of the polyester polyol to the polyether polyol is preferably 1:9 to 9:1, but not particularly limited to this. The properties such as flexibility, resistance to acid and alkali, and high elongation can be realized by maintaining the content in the above range.

The adhesive composition may comprise a block isocyanate as curing agent wherein a part or all of the isocyanate groups are blocked with a blocking agent so as to ensure about 110° C. to about 150° C. as a crosslinking temperature range. Examples of the blocking agent may be ε-caprolactam, methylethylketone oxime, 1,2-pyrazole, diisopropylamine or 3,5-dimethylpyrazole and the like.

A catalyst for urethane reaction, a polymerization initiator and the like may be added to prepare a polyurethane polymer. The urethane reaction catalyst is added in small amounts during the urethane reaction, and preferred examples thereof may be copper naphthenate, cobalt naphthenate, zinc naphthenate, n-butyltinlaurate, tristhylamine, 2-methyltriethylene diamide and the like.

Preferred examples of the polymerization initiator may be diibutyltin dilaurate (DBTDL), hydroquinone, hydroquinone monomethyl ether, para-benzoquinone, phenothiazine, and mixtures thereof. Since the amount of the catalyst used may affect the flowability of the reaction mixture, the processes involved in the formation of the surface layer of the product in addition to the reactivity, and the obtained product, the polyurethane polymer preferably comprises the catalyst in an amount of about 0.01 to 0.03% by weight.

The adhesive composition for vacuum thermoforming may further comprise at least one additive selected from the group consisting of an adhesion imparting resin, a low molecular weight material, an epoxy resin, a curing agent, a UV stabilizer, an antioxidant, a colorant, a reinforcing agent, a defoaming agent, a surfactant, a plasticizer, a foaming agent, an organic salt and combinations thereof.

The adhesive for the vacuum heat-setting composition comprises a curing agent. The curing agent proceeds a curing reaction by blocking the isocyanate group so that the isocyanate group (—NCO) is not reacted with the hydroxyl group (—OH) or the amino group (—NH) at room temperature, and thus the blocking agent is dissociated and the reactivity of the isocyanate group (—NCO) is increased when the blocking agent receives a certain amount of heat. Dissociation temperature of the curing agent is not less than 100° C., preferably 110° C. to 130° C.

The viscosity of the adhesive composition for vacuum thermoforming is about 800 cps to about 7,000 cps, preferably about 1,000 cps to about 5,000 cps. By maintaining the viscosity within the above range, the adhesive can have good high-temperature durability and adhesion, so that the decorating sheet for decorating the surface of injection mold can be stably attached to the injection mold without being slid or damaged.

Decoration Sheet for Vacuum Thermoforming

The present invention provides a decoration sheet for vacuum thermoforming comprising an adhesive layer; a substrate layer formed on the adhesive layer; a printing layer formed on the substrate layer; and a transparent substrate layer formed on the printing layer, wherein the adhesive layer is formed from the said adhesive composition for vacuum thermoforming.

FIG. 1 schematically shows the cross section of the decoration sheet 100 for the vacuum thermoforming. Referring to FIG. 1, the decoration sheet 100 for vacuum thermoforming has a structure in which an adhesive layer 10, a substrate layer 20, a printing layer 30, and a transparent substrate layer 40 are sequentially laminated.

The decoration sheet 100 for vacuum thermoforming is used for decorating the surfaces of various interior and exterior materials and can be attached to those materials by a vacuum thermoforming method. The adhesive layer 10 is consisted of the said adhesive composition which has a melting temperature and a crosslinking temperature suitable for vacuum thermoforming, and is excellent in high temperature durability so that it can be adhered even to a substrate having low surface energy without deteriorating.

Specifically, the thickness of the adhesive layer 10 is about 10 μm to about 50 μm. The thickness range of the adhesive layer 10 can exhibit excellent adhesion even on a curved surface, and excellent adhesion can be easily achieved in the vacuum thermoforming process.

The decoration sheet 100 for vacuum thermoforming comprises a substrate layer 20 on the adhesive layer 10. The substrate layer 20 serves as a central role of the decoration sheet for vacuum thermoforming, and it has excellent durability while ensuring excellent heat resistance in a vacuum thermoforming process.

Specifically, the substrate layer 20 may comprise at least one selected from the group consisting of polymethylmethacrylate (PMMA), acrylonitrile-butadiene-styrene (ABS), thermoplastic polyolefin (TPO), polyvinyl chloride (PVC), polycarbonate (PC) and combination thereof. For example, in case that the substrate 20 comprises acrylonitrile-butadiene-styrene (ABS), excellent moldability and heat resistance can be achieved at the same time.

The thickness of the substrate layer 20 is about 0.5 mm to about 3 mm. The thickness range of the substrate layer 20 can ensure excellent heat resistance in the vacuum thermoforming process of the decorative sheet while ensuring excellent durability.

The decoration sheet 100 for vacuum thermoforming comprises a printing layer 30 on the substrate layer 20. The printing layer 30 may be formed by selectively employing various raw materials and printing methods as needed and forming a printing pattern, and serves as a role of directly imparting an aesthetic effect to the decoration sheet.

More specifically, the printing layer 30 can be formed employing at least one method selected from the group consisting of gravure printing, flexographic printing, rotary screen printing and combination thereof. For example, the substrate layer 20 may comprise polycarbonate (PC), polyethylene terephthalate (PET) or acrylonitrile-butadiene-styrene (ABS) which is thermoformable. In this case, the printing layer is formed on the substrate layer 20 using the direct printing method without damaging the substrate, so that the cost reduction and the defect rate can be reduced by simplifying the process than the conventional transfer method.

The thickness of the printed layer 30 is about 1 μm to 40 μm. The thickness range of the printing layer 30 can ensure excellent compatibility with the embossed layer 2 formed on top of the decoration sheet at the same time showing a clear printing pattern.

The decoration sheet 100 for vacuum thermoforming may comprise a transparent substrate layer 40 on the printing layer 30. The transparent substrate layer 40 may comprise, but is not limited to, polymethylmethacrylate (PMMA). The transparent substrate layer 40 serves to protect the printing layer 20 and improve gloss and abrasion resistance.

Also, the surface treatment agent may be coated directly on the printing layer 30 instead of the transparent substrate layer 40. That is, the decoration sheet 100 for vacuum thermoforming may further comprise a coating layer of the surface treatment agent between the emboss layer 2 and the printing layer 30, instead of the transparent substrate layer 40.

Figure 2:
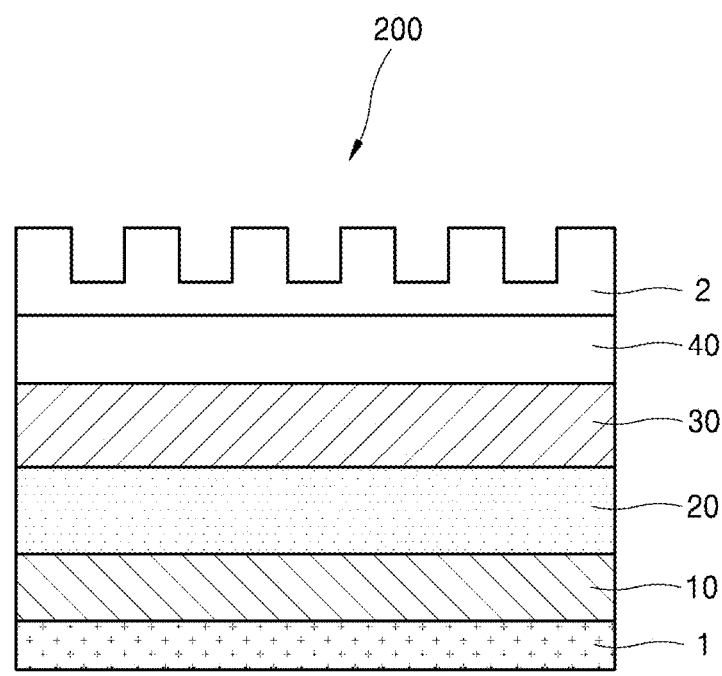
FIG. 2 schematically shows the cross section of the decoration sheet for vacuum thermoforming according to another embodiment of the present invention.

FIG. 2 schematically shows the cross section of the decoration sheet for vacuum thermoforming according to another embodiment of the present invention.

The decoration sheet for vacuum thermoforming 200 may further comprise a release film layer 1 under the adhesive layer 10. The release film layer 1 is to be peeled off before the decoration sheet is used in the vacuum thermoforming, and serves to facilitate distribution and transportation of the decoration sheet 100.

Specifically, the release film layer 1 may comprise polyethylene terephthalate (PET), and more specifically, a polyethylene terephthalate (PET) film coated with a silicone coating agent may be used. In this case, when the adhesive layer 10 is formed directly on the release film layer 1, excellent coatability and peelability can be secured.

The thickness of the release film layer 1 is about 20 μm to about 100 μm. The thickness of the release film layer 1 can facilitate the peeling, and secure excellent processability in the process of forming the adhesive layer 10 on the release film layer 1.

Further, the decoration sheet for vacuum thermoforming 200 may further comprise the embossed layer 2 on the transparent substrate layer 40. Specifically, the embossed layer 2 may be formed by an embossing process.

The embossed layer 2 comprises recessed and convex portions formed by the embossed pattern, thereby exerting a better aesthetic effect on the printed pattern of the printing layer.

Hereinafter, preferred examples of the present invention will be described in order to facilitate understanding of the present invention. However, the following examples are provided only for the purpose of easier understanding of the present invention, and the present invention is not limited by the following examples.

Example 1

1. Preparation of the Adhesive Composition
1) Synthesis of Acrylic Polymer

Monomer mixtures consisting of 20 parts by weight of 2-ethylhexyl acrylate (2-EHA), 40 parts by weight of n-butyl acrylate (n-BA), 30 parts by weight of isobonyl acrylate (IBOA), 10 parts by weight of 2-hydroxyethyl acrylate (HEA), 0.05 part by weight of n-dodecyl mercaptan as a molecular weight modifier were introduced in a 20 L-reactor equipped with a cooling system for controlling temperature and containing a nitrogen gas under reflux, and then methyl ethyl ketone (MEK) as a solvent was added thereto to prepare an acrylic polymer having a weight average molecular weight of 600,000 and a glass transition temperature of −26° C.

2) Synthesis of Polyurethane Polymer 900 g of polypropylene glycol, 500 g of maleic anhydride and 500 g of phthalic anhydride were condensed in a 20 L-reactor equipped with a cooling system for controlling temperature and containing a nitrogen gas under reflux. When the condensation reaction was completed, methyl ethyl ketone (MEK) was added thereto to lower the viscosity. Then, 0.5 mole of xylene diisocyanate and a block isocyanate 'BI7990' (Baxenden Co., Ltd.) were added thereto to synthesize an integral solution of polyurethane polymer.

95 parts by weight of the polyurethane polymer and 5 parts by weight of the acrylic polymer were blended to prepare an adhesive composition.

2. Preparation of the Decoration Film for Vacuum Thermoforming

A printing layer having a thickness of 20 μm was formed on the acrylonitrile-butadiene-styrene (ABS) substrate layer having a thickness of 0.15 mm by a gravure printing method. A transparent substrate layer of polymethyl methacrylate (PMMA) having a thickness of 10 μm was formed on the printing layer, and an embossed layer was formed on the transparent substrate layer by a UV imprinting method.

On the other hand, a release film layer of polyethylene terephthalate (PET) having a thickness of 50 μm was prepared, and the adhesive composition prepared in the above Examples and Comparative Examples was coated on the release film layer to form an adhesive layer having a thickness of 35 μm. Subsequently, the preparation of the decoration sheet for vacuum thermoforming was completed by plywood lamination to adhere the adhesive layer to the lower surface of the substrate layer.

Example 2

A decorative sheet was prepared in the same manner as in Example 1 except that 90 parts by weight of the polyurethane polymer and 10 parts by weight of the acrylic polymer were blended to prepare an adhesive composition.

Comparative Example 1

A decorative sheet was prepared in the same manner as in Example 1 except that 80 parts by weight of the polyurethane polymer and 20 parts by weight of the acrylic polymer were blended to prepare an adhesive composition.

Comparative Example 2

A decorative sheet was prepared in the same manner as in Example 1 except that 80 parts by weight of the polyurethane polymer was blended to prepare an adhesive composition.

Comparative Example 3

A decorative sheet was prepared in the same manner as in Example 1 except that a block isocyanate 'BI7990' (Baxenden Co., Ltd.) used in the said synthesis of polyurethane polymer, 90 parts by weight of the polyurethane polymer and 10 parts by weight of the acrylic polymer were blended to prepare an adhesive composition.

Experimental Examples

Experiments were carried out on the following physical properties, and the results are shown in Table 1 below.

1) Evaluation of Peeling Strength

A decoration sheet for vacuum thermoforming was cut to a size of 25 mm×20 cm (width×length) to prepare a sample. Thereafter, the release film of the sample was removed, and the surface of ABS substrate was attached by a laminator heated at 130° C. After 30 minutes from the attachment, the peeling strength was measured by a tensile tester under the conditions of a peeling rate of 300 mm/min and a peeling angle of 180 degree.

2) Evaluation of High Temperature Durability

The release films were removed from the decoration sheet for vacuum thermoforming s prepared in Examples and Comparative Examples, and samples were prepared by the vacuum thermoforming method. Evaluation on the high-temperature durability was carried out by placing the samples in an oven at 80° C. for 300 hours and observing the finished state or the lifted state of the molded article and the edge portion of the sheet. The results were evaluated according to the following criteria.

Figure 3:
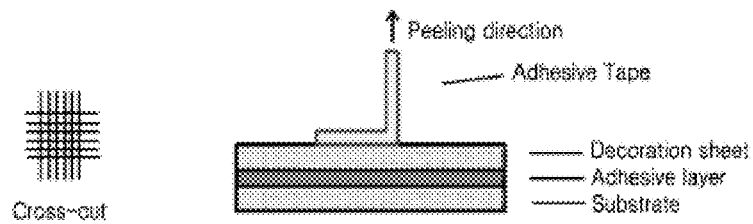
FIG. 3 schematically shows the cross-cuts for adhesion evaluation.
Figure 4A:
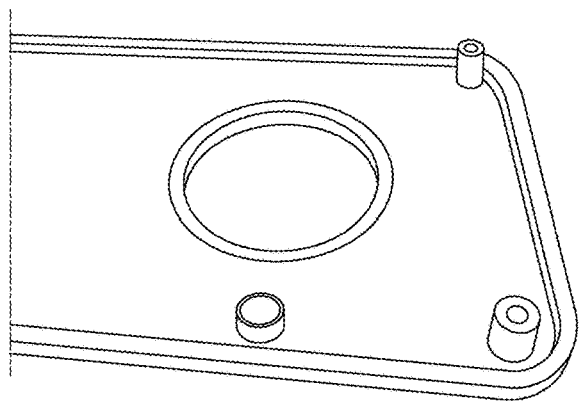
FIGS. 4A and 4B illustrate an example related to the formability evaluation.
Figure 4B:
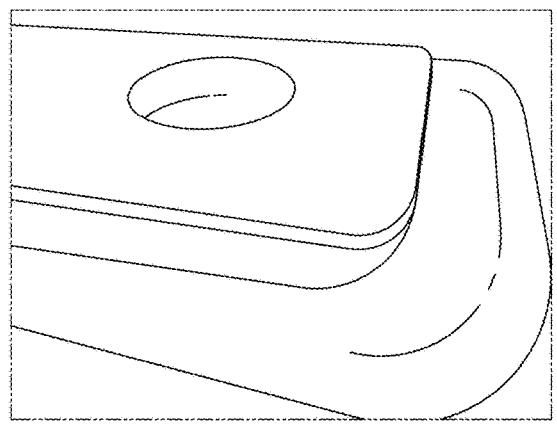

<Evaluation Criteria>
◯: No lifting is observed.
X: Lifting is observed.
3) Adhesion Evaluation
Evaluation on adhesion was carried out according to JIS K 5600-5-6. Cross-cuts are made on the surface of the samples obtained in Examples and Comparative Examples. Thereafter, the surfaces were cleaned with a soft brush and firmly attached by the specified tape (JIS Z 1522), then the tape was pulled out strongly at a 90° angle. The results were evaluated according to the following criteria (see FIG. 3).
<Evaluation Criteria>
◯: No peeling damage at the cross-cuts is observed.
Δ: 5-15% peeling at the cross-cuts is observed.
X: Peeling at all the Cross-cuts is observed.
4) Evaluation on Formability
The vacuum thermoforming was carried out at a film-realizing temperature of 150° C. It was confirmed whether or not the molded article was well formed at the curved portion, and whether the molded article and the film were well curled inwardly from the edge portion (see FIGS. 4A and 4B).

Molding Examples

<Evaluation Criteria>
◯: The molding is well formed in the curved portion, and the edge is well curled inwardly.
X: The molding is not well formed, and the edge is insufficiently curled.

MEANING OF NUMERALS 100, 200: a decoration sheet for vacuum thermoforming
10: an adhesive layer
20: a substrate layer
30: a printing layer
40: a transparent substrate layer
1: a release film layer
2: an embossed layer

The invention claimed is:

1. The adhesive composition for vacuum thermoforming comprising a polyurethane polymer and an acrylic polymer and having a difference of 30° C. to 60° C. between melting temperature and cross-linking temperature.

2. The adhesive composition for vacuum thermoforming according to claim 1 wherein the melting temperature is 50° C. to 90° C. and the cross-linking temperature is 110° C. to 150° C.

3. The adhesive composition for vacuum thermoforming according to claim 1 wherein the acrylic polymer is comprised in an amount of 1 to 10 parts by weight based on 100 parts by weight of the solid content in the adhesive composition.

4. The adhesive composition for vacuum thermoforming according to claim 1 wherein the acrylic polymer has a weight average molecular weight of 200,000 to 800,000.

5. The adhesive composition for vacuum thermoforming according to claim 1 wherein the polyurethane polymer is

TABLE 1

| | Polyurethane polymer/ Acrylic polymer | Use of block isocyantate | Crosslinking temperature (° C.) | Melting temperature (° C.) | High temperature durability | Adhesion | Peel strength | Formability |
|---|---|---|---|---|---|---|---|---|
| Exam. 1 | 95/5 | ◯ | 150 | 90 | ◯ | ◯ | 4.2 | ◯ |
| Exam. 2 | 90/10 | ◯ | 120 | 90 | ◯ | ◯ | 4.5 | ◯ |
| Com. Exam. 1 | 80/20 | ◯ | 90 | 65 | X | Δ | 4 | ◯ |
| Com. Exam. 2 | 100/0 | ◯ | 60 | 150 | X | X | 2 | X |
| Com. Exam. 3 | 90/10 | X | 90 | 90 | X | X | 3.5 | X |

As shown in Table 1, it was confirmed that the decoration sheets of Examples were excellent in formability, high temperature durability, adhesion and peel strength as compared to Comparative Examples 1, 2, and 3. Particularly, the adhesive of Comparative Example 2, which does not contain an acrylic polymer was significantly poor in the physical properties as a whole. Also, the adhesive of Comparative Example 3 in which the block isocyanate was not used had a very low crosslinking temperature and lowered physical properties.

Therefore, it was confirmed that the decoration sheet produced by using the adhesive composition for vacuum thermoforming according to the present invention was excellent in high temperature durability, formability, adhesion and peeling strength, since the adhesive composition comprising a polyurethane polymer and an acrylic polymer within the range defined in the present invention had a difference of 30° C. or more between a melting temperature and a crosslinking temperature comprised in an amount of 90 to 99 parts by weight based on 100 parts by weight of the solid content in the adhesive composition.

6. The adhesive composition for vacuum thermoforming according to claim 1 wherein the polyurethane polymer has a weight average molecular weight of 1,000 to 30,000.

7. The adhesive composition for vacuum thermoforming according to claim 1 wherein the polyurethane polymer is produced from an isocyanate compound and a polyol compound.

8. The adhesive composition for vacuum thermoforming according to claim 7 wherein the polyol compound contains one or more selected from the group consisting of a polyester-based polyol, a lactone-based polyol, a polycarbonate-based polyol, a polyether-based polyol and a combination thereof.

9. The adhesive composition for vacuum thermoforming according to claim 1 further comprising at least one additive selected from the group consisting of an adhesion-providing resin, a low molecular weight polymer, an epoxy resin, a curing agent, an UV stabilizer, an antioxidant, a colorant, a reinforcing agent, an anti-foaming agent, a surfactant, a plasticizer, a foaming agent, an organic salt and a combination thereof.

10. The adhesive composition for vacuum thermoforming according to claim 1 wherein the adhesive composition has a viscosity of 800 to 7,000 cps.

11. The decoration sheet for vacuum thermoforming comprising:
an adhesive layer;
a substrate layer formed on the adhesive layer;
a printing layer formed on the substrate layer; and
a transparent substrate layer formed on the printing layer, wherein the adhesive layer is formed from the adhesive composition for vacuum thermoforming according to claim 1.

12. The decoration sheet for vacuum thermoforming according to claim 11 wherein a thickness of the adhesive layer is 10 μm to 50 μm.

13. The decoration sheet for vacuum thermoforming according to claim 11 wherein the substrate layer comprises at least one selected from the group consisting of a polymethyl methacrylate (PMMA), an acrylonitrile-butadiene-styrene (ABS), a thermoplastic polyolefin (TPO), a polyvinyl chloride (PVC), a polycarbonate (PC) and a combination thereof.

14. The decoration sheet for vacuum thermoforming according to claim 11 further comprising a release film layer on the lower surface of the adhesive layer.

15. The decoration sheet for vacuum thermoforming according to claim 14 wherein the release film layer comprises a polyethylene terephthalate (PET) film.

16. The decoration sheet for vacuum thermoforming according to claim 11 wherein the printing layer is formed by at least one method selected from the group consisting of a gravure printing, a flexographic printing, a rotary screen printing and a combination thereof.

17. The decoration sheet for vacuum thermoforming according to claim 11 further comprising an embossed layer on the transparent substrate layer.

18. The decoration sheet for vacuum thermoforming according to claim 17 wherein the embossed layer is formed by an embossing process.

* * * * *